(12) United States Patent
Acharya et al.

(10) Patent No.: US 7,872,976 B2
(45) Date of Patent: Jan. 18, 2011

(54) SYSTEM AND METHOD FOR MULTI-PROTOCOL LABEL SWITCHING NETWORK TUNING

(75) Inventors: Swarup Acharya, New Providence, NJ (US); Bhawna Gupta, Edison, NJ (US); Pankaj Risbood, Roselle, NJ (US); Anurag Srivastava, Roselle, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1671 days.

(21) Appl. No.: 10/428,464

(22) Filed: May 2, 2003

(65) Prior Publication Data

US 2004/0218595 A1 Nov. 4, 2004

(51) Int. Cl.
*G01R 31/08* (2006.01)
*G06F 11/00* (2006.01)
*G08C 15/00* (2006.01)
*H04J 3/14* (2006.01)
*H04L 1/00* (2006.01)

(52) U.S. Cl. .................................................. 370/237

(58) Field of Classification Search ........... 370/229–31, 370/35, 237, 54, 351, 89, 94, 395.41, 400, 370/68, 230, 249, 254, 395.4, 394, 392, 389; 709/235, 39, 239
See application file for complete search history.

(56) References Cited

U.S. PATENT DOCUMENTS

| | | | |
|---|---|---|---|
| 6,965,572 B1 * | 11/2005 | Boodaghians | 370/249 |
| 7,012,919 B1 * | 3/2006 | So et al. | 370/392 |
| 7,246,175 B1 * | 7/2007 | Tappan et al. | 709/245 |
| 2001/0037401 A1 * | 11/2001 | Soumiya et al. | 709/232 |
| 2002/0186658 A1 * | 12/2002 | Chiu et al. | 370/237 |
| 2004/0213221 A1 * | 10/2004 | Civanlar et al. | 370/389 |
| 2005/0159167 A1 * | 7/2005 | Hakalin et al. | 455/453 |

\* cited by examiner

*Primary Examiner*—Seema S Rao
*Assistant Examiner*—Leon Andrews
(74) *Attorney, Agent, or Firm*—Hitt Gaines, PC

(57) ABSTRACT

A system for and method of multi-protocol label switching (MPLS) network tuning. In one embodiment, the system includes a hot zone clearing subsystem that recursively identifies label switched paths (LSPs) to be rerouted from a defined hot zone subject to edges to be avoided. In that embodiment, the system further includes an LSP ordering subsystem, which is coupled to the hot zone clearing subsystem, that orders the LSPs to be rerouted to yield a migration sequence. The migration sequence is employable to reduce a load of the hot zone.

19 Claims, 6 Drawing Sheets

FIG. 4

```
// The function HZG reduces the load on the edges in the hot zone by rerouting a subset of LSPs that
   pass through the hot zone.
// Input - edgeListInHZ: list of edges in hot zone, avoidEdges: list of edges that should be avoided while
   rerouting, depth: function recursion level, α: load reduction factor, β: load threshold
// Output - transition Sequence: An ordered list of LSP reroutes 1) transition Sequence HZG(edgeList, avoidEdges, depth = 1, α, β)
2) If (depth > MAXDEPTH), return NULL.
3) LSPList = all LSPs passing through the hot zone
4) sortedLspList = sortLSP(LSPList)
5) If residual bandwidth on any edge in edgeList ≤ α * bw
6)      LSP = next LSP in the sortedLSPList
7)      If (LSP == NULL), return outList
8)      tmpList = tryToMoveLSP(LSP,depth,avoidEdges, β)
9)      If (tmpList == NULL) LSP cound not be moved
10)     Else
11)         append tmpList to outList, Goto Step 5
12) Else
13)     return outList // The function tryToMoveLSP reroutes an LSP to avoid the edges given as input
// Input - LSP: The LSP that needs to be rerouted, depth: recursion level, avoidEdges: edges that should
   be avoided while rerouting the LSP, β: load threshold
// Output - transitionSequence: An ordered list of LSP reroutes 14) transitionSequence tryToMoveLSP(LSP,depth,avoidEdges, β)
15) sortedRouteList = sortRoute(list of candidate routes for this LSP that avoid avoidEdges)
16) route = next route from sortedRouteList
17) If (route == NULL), return NULL
18) If ((route → availableBw >= LSP → bw) and (edge → residual,bw - LSP → bw >= β*edge → bw
    for all edges on the route))
19)     put route as the new route for LSP and add this transition to the returnList
20)     return returnList
21) Else
22)     sortedEdgeList = sortEdges(all edges in route)
23)     edge = next edge from sortedEdgeList
24)     If (edge == NULL), Goto Step 31
25)     If (edge → residualbw - LSP → bw >= β*edge → bw), Goto Step 23
26)     Else
27)         tmpList = HZG(edge,avoidEdges+all edges in edgeList,depth + 1,max(LSP → bw/edge →
    bw,β),β)
28)         If (edge → residualbw - LSP → bw >= β*edge → bw)
29)             add tmpList to returnList, Goto Step 23
30)         Else undo returnList. Goto Step 16
31) put route as new route for LSP and add it to returnList, return returnList
```

700

710

800

830

US 7,872,976 B2

SYSTEM AND METHOD FOR MULTI-PROTOCOL LABEL SWITCHING NETWORK TUNING

TECHNICAL FIELD OF THE INVENTION

The present invention is directed, in general, to Multi-Protocol Label Switching (MPLS) and, more specifically, to a system and method for network tuning using MPLS.

BACKGROUND OF THE INVENTION

Multi-protocol Label Switching (MPLS) has emerged as a key technology for service providers. One of the primary applications for MPLS is traffic engineering (TE) (see, Awduche, et al., "Requirements for traffic engineering over MPLS," IETF RFC 2702, 1997, incorporated herein by reference). MPLS TE capabilities are attractive because they provide the flexibility to control the routing via Label Switched Paths (LSPs).

Traditionally, TE has focused on efficient routing of individual LSPs. However, as network traffic migrates from voice to data (adding to network "churn"), maintaining or improving network efficiency levels is becoming evermore difficult. This is further exacerbated by the fact that data lacks the hierarchical growth structure of voice traffic. Thus, service providers are seeking tools for network-wide engineering and management of their MPLS networks.

In conjunction with standardized signaling protocols such as RSVP (see, Awduche, et al., "Extension to RSVP for LSP tunnels," IETF draft, 1998, incorporated herein by reference), MPLS provides infrastructure for disruption-free reconfiguration with constructs such as make-before-break. Make-before-break does not guarantee hitless packet delivery by itself. However, when coupled with the resiliency of the client services such as TCP based applications, make-before-break ensures disruption-free reconfiguration in most operational scenarios.

Unfortunately, no network management system exists that employs this reconfigurability infrastructure to improve end-to-end efficiency. Furthermore, no such system exists that operates online and without any service interruption. The process of hitless, network-wide engineering may be referred to as "network tuning." Note that network tuning can either be proactive to prevent future inefficiencies or reactive in response to specific network events such as failures. Unlike TE, tuning is not a per-LSP parameter—(e.g., bandwidth or, route) tweaking operation but encompasses the end-to-end network operation. The example below illustrates the concept.

Referring initially to FIG. 1, illustrated is an exemplary network of six IP routers, seven links of capacity B and three LSPs L1-L3 of capacity B/2. Let there be a new LSP request between A and C for bandwidth B. In a regular MPLS network, A would reject this request because of insufficient bandwidth to C. However, sufficient capacity does exist in the network, but it is fragmented. A network management system with tuning intelligence could proactively re-engineer the traffic to ensure that the demand is satisfied.

For example, rerouting L2 via A-E-F and L3 via A-B-D would allow the new LSP request to be provisioned along A-C. Thus, by such online tuning, requests that would otherwise have been denied can be satisfied and in the long run, help improve network utilization and lower the capital expenditure.

However, scaling tuning to networks with hundreds of nodes and LSPs presents a serious computational challenge.

Furthermore, while MPLS provides the necessary mechanisms to minimize disruption during traffic reconfiguration, it does not provide any intelligence on how one might exploit it. Note that network tuning involves not only determining the routes for the various LSPs (the flow design problem) but more critically, deriving the sequence of LSP rerouting steps that prevents any service disruption (the path migration problem).

Prior work on the flow design problem has focused on the optimal flow assignment without any consideration for path migration. One such example is given in Elwalid, et al., "Online traffic engineering with design-based routing," in Proceedings of ITC Specialist Workshop, Wurzburg, July 2002 (incorporated herein by reference) and the other references cited therein. The problem of path migration has been studied in the context of optical WDM networks. In Ramamurthy, et al., "Virtual Topology Reconfiguration of Wavelength-routed Optical WDM Networks," IEEE GLOBECOM Proceedings, 2000 (incorporated herein by reference), a reconfiguration constraint is added to the LP formulation for the flow design problem and Sridharan, et al., "Operating Mesh-Survivable WDM Transport Networks," SPI Int. Symp. Terabit Optical Networking, November 2000 (incorporated herein by reference) adds a reconfiguration cost to the ILP formulation for network optimization. However, the goal in both is to minimize reconfiguration, and any reconfiguration is still service-disruptive. Bala, et al., "Towards Hitless Reconfiguration in WDM Optical Networks for ATM Transport," IEEE GLOBECOM Proceedings, 1996 (incorporated herein by reference) proposed a way to achieve hitless reconfiguration assuming sufficient resources to support the union of the original and optimized configuration, an assumption unlikely to hold in practice.

Accordingly, what is needed in the art is a system and method for achieving effective disruption-free network tuning in an MPLS network.

SUMMARY OF THE INVENTION

To address the above-discussed deficiencies of the prior art, the present invention provides a system for and method of MPLS network tuning. In one embodiment, the system includes: (1) a hot zone clearing subsystem that recursively identifies LSPs to be rerouted from a defined hot zone subject to edges to be avoided and (2) an LSP ordering subsystem, coupled to the hot zone clearing subsystem, that orders the LSPs to be rerouted to yield a migration sequence. The migration sequence is employable to reduce (perhaps to zero) a load of the hot zone.

In one embodiment of the present invention, the hot zone clearing subsystem recursively identifies the LSPs subject to a defined recursion depth. In a related embodiment, the hot zone clearing subsystem recursively identifies the LSPs until the load is decreased to a defined level.

The LSP reordering subsystem orders the LSPs according to a selected one of: (1) number of links of the LSPs in the defined hot zone and (2) bandwidth of the LSPs. Of course, other ordering heuristics fall within the broad scope of the present invention.

In one embodiment of the present invention, the LSPs are rerouted to candidate routes selected according to a selected one of: (1) load on the maximally utilized link in the candidate routes, (2) length of candidate routes and (3) sharing of links with the LSPs. Other rerouting heuristics fall within the scope of the present invention. In a more specific embodiment, when one of the candidate routes lacks sufficient bandwidth on any link thereof, the hot zone clearing subsystem recursively identifies LSPs to be rerouted from a second defined hot zone containing the one of the candidate routes.

In one embodiment of the present invention, the LSP ordering subsystem orders the LSPs based on a selected one of: (1) least available bandwidth, (2) greatest bandwidth and (3) number of links. Of course, other ordering heuristics fall within the scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 4 illustrates a pseudo-code listing of a software program embodying a disclosed algorithm that practices the principles of the present invention;

DETAILED DESCRIPTION

Figure 1:
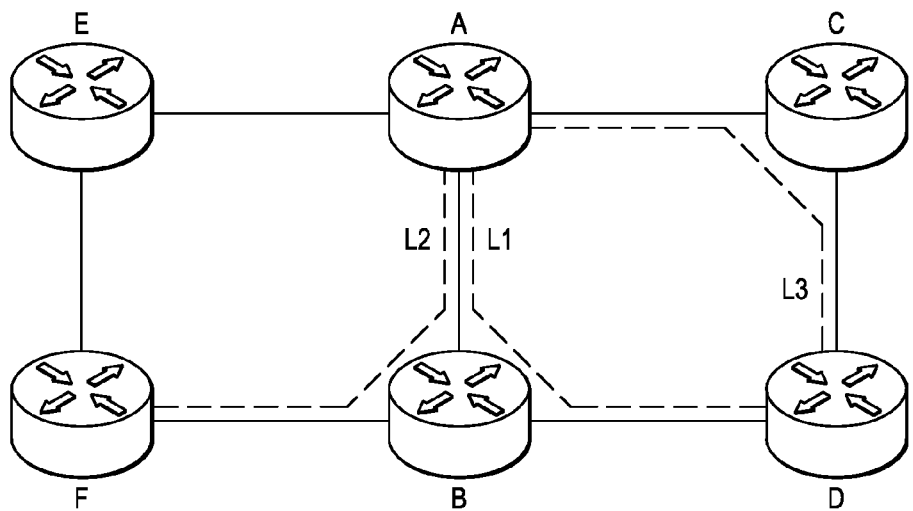
FIG. 1 illustrates a diagram of an exemplary network to which the principles of the present invention may be applied.

Algorithmic issues in network tuning will now be described, which will lead to a definition of the Hot Zone Clearing, or "HZC," problem. First, two example network operations scenarios that occur on the field will be presented. Then, the scenarios will be used to abstract out a core algorithmic problem that is to be solved by the illustrated embodiment of the present invention.

Consider the two operational scenarios below and the requirements on the network management system to address them:

(1) Setup Failure Tuning (SFT): This is the case illustrated in FIG. 1 and previously described in the Background of the Invention section. Given a failure of an LSP setup, the requirement of a tuning tool is to rearrange existing traffic to satisfy the demand and do so without service interruption.

(2) Hot Zone Clearing (HZC): Network elements routinely require downtime (e.g., to upgrade software) during which time traffic through them has to be rerouted. Manual rerouting done today is a cumbersome and error-prone task. Instead, the ability to select a "hot zone" (specific nodes or links) such that the traffic flowing through it is cleared would be an attractive tool for operators. Another motivation for HZC is to balance load. HZC provides a way for an operator to mark an overly congested area and have some of the LSPs rerouted. Note that care should be taken to ensure that the traffic being cleared is not impacted and does not create bottlenecks elsewhere.

A number of other operations scenarios are appropriate for network tuning. However, such scenarios will not be described herein, as those persons skilled in the pertinent art will be readily able to apply the teachings herein to those scenarios without further explanation.

The HZC scenario is the more general case of the two problems above. One may map the SFT case to HZC by first choosing a candidate route for the new request and then performing a HZC operation on the edges along this chosen route. Therefore, the HZC problem will be the focus herein. Formally, the HZC problem can be stated as follows:

HZC definition: Let G(V,E) be a network of V nodes and E edges. Given a set of edges $E_c$ (hot zone) to be cleared $E_c \subset E$, reroute LSPs flowing through edges in $E_c$, such that the load on all edges $e_i$, $e_i \in E_c$, is lowered to $\alpha$ and that the load on all edges $e_j$ not in $E_c$ ($e_j \in (E-E_c)$) is not increased to beyond $\beta$. The parameter $\beta$ preferably ensures that the bottleneck is simply not migrated elsewhere from the hot zone.

Broadly, the HZC requires solving two different optimization problems. The first is a standard traffic flow design problem, where the goal is to determine an optimal LSP route design, given an end-to-end demand matrix and the residual bandwidth available on various links. The second step is the path migration problem which, given the optimized LSP topology, finds the optimal hitless path migration sequence from the current topology to the optimized one.

Unfortunately, both these problems correspond to known NP-hard problems. The first is a variant of the multi-commodity flow design problem with integer solutions (see, Ahuja, et al., Network Flows: Theory, Algorithms, and Applications, Prentice Hall, 1993) and the latter can be reduced from the set-ordering problem (see, Shepherd, et al., "Hardness of Path Exchange Problem," Personal Communication, and, Garey, et al., Computers and Intractability—A Guide to the Theory of NP-Completeness, Freeman, Calif., USA, 1979), and neither of them admits efficient solutions. The latter problem is particularly difficult to solve and offers little hope of efficient approximation. Therefore, this two-step approach has limited use in an online setting where hitless transition is a key prerequisite.

Instead, a novel integrated network optimization algorithm is introduced and disclosed herein that tackles both problems simultaneously and uses approximate heuristics to make them tractable. That algorithm will now be described, as well as approximation heuristics used to break the NP-hardness of the problem.

The goal of the HZC problem is to reduce the load on the links in the selected hot zone by a given factor, without overloading the rest of the network. This is achieved by rerouting a subset of LSPs passing through the hot zone while maintaining all constraints on the LSP path. An example to demonstrate how the algorithm works will be presented and the algorithm described in detail.

Recalling FIG. 1, a request for setup of a new LSP from router A to C with bandwidth B failed due to lack of bandwidth. However, even though there is insufficient bandwidth on paths from A to C, the network on the whole has enough spare bandwidth. Hence, the demand for the LSP setup could be met by a) selecting a route for provisioning the new LSP and b) performing a HZC on this route. Assume that the route chosen was A-C. Since the new LSP requires the entire bandwidth of the link A-C, existing LSPs on the link are forced to be rerouted, namely LSP L3. This translates to the sub-problem of LSP setup for L3 leading to a HZC on its new route A-B-D. Finally, the LSP on this route, L2, is rerouted, completing the transition sequence (L2, A-E-F), (L3, A-B-D) and (new LSP, A-C). Note that an alternate route (A-E-F-B-D) exists for L3, but it may not necessarily be a candidate route if it is bound by constraints such as delay and hop count.

The example shows that performing a HZC on a hot zone is a recursive procedure and may lead to rerouting of the LSPs that do not pass through the hot zone (e.g., L2 and L3), in addition to the new LSPs that pass through the hot zone. The algorithm will now be described in detail.

Figure 2:
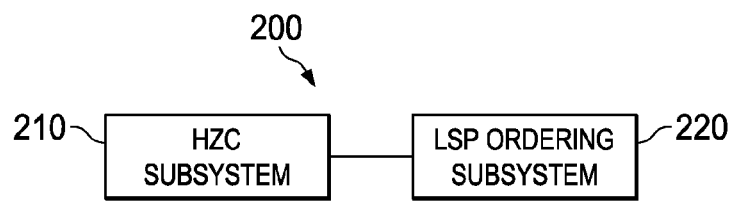
FIG. 2 illustrates a block diagram of one embodiment of a system for MPLS network tuning constructed according to the principles of the present invention.

Turning now to FIG. 2, illustrated is a block diagram of one embodiment of a system, generally designated 200, for MPLS network tuning constructed according to the principles of the present invention. The system 200 includes an HZC subsystem 210. The HZC subsystem 210 recursively identifies LSPs to be rerouted from a defined hot zone subject to edges to be avoided. The system 200 further includes an LSP ordering subsystem 220. The LSP ordering subsystem 220 is coupled to the HZC subsystem 210 and orders the LSPs to be rerouted to yield a migration sequence. The migration sequence is employable to reduce (perhaps to zero) a load of the hot zone.

Figure 3:
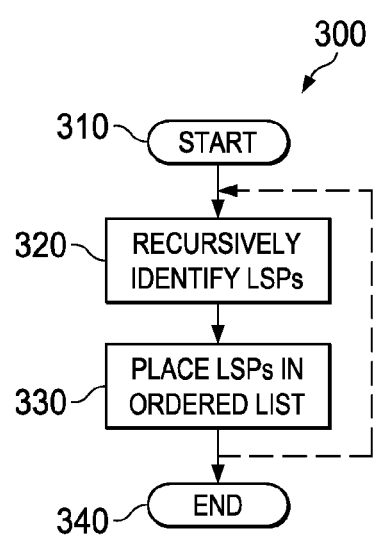
FIG. 3 illustrates a flow diagram of one embodiment of a method for MPLS network tuning carried out according to the principles of the present invention.

Turning now to FIG. 3, illustrated is a flow diagram of one embodiment of a method, generally designated 300, for MPLS network tuning constructed carried out to the principles of the present invention. The method 300 begins in a start step 310, wherein it is desired to clear a hot zone, at least partially, of LSPs. The method 300 proceeds to a step 320, in which LSPs to be rerouted from a defined hot zone are recursively identified, subject to edges to be avoided. The method proceeds to a step 330, wherein the LSPs identified in step 320 are placed in an ordered list called a "migration sequence." The migration sequence is employable to reduce (perhaps to zero) a load of the hot zone. Depending upon the defined recursion depth, the steps 320, 330 are repeated. A broken line doubling back from the step 330 to the step 320 represents this optional recursion. When the maximum recursion depth is reached, the method 300 ends in an end step 340.

Turning now to FIG. 4, illustrated is a pseudo-code listing of a software program 400 embodying a disclosed algorithm that practices the principles of the present invention. The function HZC is a recursive function that reroutes the LSPs in a hot zone to reduce the hot zone load. The input to the function is the set of links in the hot zone, a list of edges to be avoided while rerouting, current depth of recursion and the load factors $\alpha$ and $\beta$.

The output is an ordered list that provides the migration sequence of LSPs from their original path to their computed path. The depth of the recursion is limited to MAXDEPTH by parameter depth as shown in step 14. The avoidEdges list is used to ensure that no LSP uses any link in the hot zone while rerouting by marking links in the hot zone as links to be avoided. Until the load on all the links in the hot zone is brought down to the required $\alpha$, the LSPs in the input list are rerouted one at a time to avoid the avoidEdges.

The order in which the LSPs are explored for rearrangement is a heuristic for breaking the hardness of the problem, since determining the optimal order has exponential complexity. The function sortLSP in step 4 uses one of the heuristics described herein to order the LSPs. A call to function tryToMoveLSP in step 8 returns with a sequence of LSPs reroutes that need to be performed in order to move the input LSP. In case no such sequence is possible the input LSP is ignored. The algorithm terminates with the transition sequence when the hot zone load goes down to the required level or if there are no more LSPs to be rerouted.

The function tryToMoveLSP reroutes a single LSP, avoiding the edges in the list of avoidEdges and returns a sequence of LSP reroutes that need to be performed for the reroute of this LSP. In step 15, all possible routes that satisfy the service requirements and avoid links from the list avoidEdges are sorted based on a set of heuristics described herein. The routes are then explored in order to find out the route that has enough bandwidth to route the LSP such that the load on any link in the route should not exceed the load factor as shown in step 18. If the route has insufficient bandwidth, the links on that route are sorted based on another heuristic as in step 22. The links in the route are added to the list of avoidEdges and then a HZC is performed on each link in the sorted order and the recursion depth is incremented by one. The transition sequence obtained from this HZC is added to the tail of a local sequence.

If HZC fails to perform on any link, all the work that had been done for clearing previous links on this route is rolled back in step 30, as that route can no longer be used for rerouting the LSP. The next candidate route is then explored. If the next candidate route is the last route on the list, a NULL list signifying failure to reroute the LSP is returned in step 17. On the other hand, if all the links on the selected route had enough bandwidth cleared as in step 31, this route is added as the new route for the LSP, the LSP transition is added to the local sequence and the local transition sequence is returned.

As can be seen, HZC is a recursive process, as HZC of a defined hot zone leads to rerouting of LSPs that may again lead to a HZC on the candidate routes of the LSPs and so on. The level of recursion (advantageously bound by MAXDEPTH) determines how much traffic outside the hot zone is rerouted in addition to the traffic from within the hot zone. It should be apparent to those skilled in the pertinent art that higher the level of recursion, the greater is the flexibility for HZC. This flexibility is instrumental in the superior performance of the algorithm as compared to other more traditional algorithms as Experiment 1 below shows.

As opposed to a two step flow design and path migration approach, the algorithm described herein uses a search tree based approach with intelligent pruning mechanisms to minimize the search. Even though it is not possible to give a theoretical bound for the run time of the algorithm, the algorithm proves to be extremely efficient in practice.

The disclosed algorithm uses different approximation heuristics at different stages of the algorithm. The heuristics that can be used will now be described and some of their advantages set forth:

(1) SortLSP: When there are multiple LSPs to be rerouted, the rerouting order of the LSPs has to be determined so as to minimize the number of LSPs that will need to be rerouted in order to reduce the load on the hot zone. Since determining this optimum is a NP hard problem some heuristics are used to order the LSPs.

(1a) MaxSharedLSPFirst: This heuristic chooses the LSP that goes through the maximum number of links in the hot zone to be cleared, to be rerouted first. The assumption is that the movement of this single LSP will reduce load on the maximum number of links from the hot zone. Consequently fewer number of LSPs will have to be moved.

(1b) BiggestLSPFirst: This heuristic chooses the LSP with the maximum bandwidth to be rerouted first. The expectation is that rerouting of this single LSP will free up the maximum resources from the hot zone, and is better than rerouting a lot of smaller LSPs to free up the same resources.

(2) SortRoute: When an LSP needs to be rerouted, there is a choice of many candidate routes for the LSP. The selection of a candidate route has effect on future reroutes as it may be using some critical resource or because a HZC operation performed on that route may lead to more LSPs being rerouted.

(2a) MinMaxUsage: The route that has more links loaded to near their capacity, should be avoided if possible as the selection of that route may block a critical link. Therefore the route that minimizes the maximum usage of all links in the route should be preferred for rerouting.

(2b) ShortestRoute: This heuristic assumes that choosing the smallest length route for rerouting will reduce the number of resources occupied by the LSP thereby increasing the probability of further reroutes to be successful. Also in case of a HZC on that route will the size of the hot zone will be smallest thus potentially reducing the number of LSPs to be rerouted.

(2c) LeastDisruptive: This is based on the assumption that the selection of a route that shares the maximum number of links with the current route of the LSP will potentially cause lesser disruption. Even in the case when a HZC has to be performed on the route, lesser number of links will form the hot zone thus potentially reducing the number of LSPs to be rerouted. Since this route should avoid all the edges in the hot zone its value may be restricted if the LSP is mostly inside the hot zone.

The disclosed algorithm uses a combination of the MinMaxUsage and the ShortestRoute heuristics to order the candidate routes for exploration.

(3) SortLink: When a candidate route does not have enough free bandwidth to route an LSP, HZC has to be performed on all the links in the candidate route. The order in which the links are processed may determine the success or failure of the HZC operation on the route and may be based on the following heuristics:

(3a) MaxUsageFirst: This heuristics implies that the link that has the least available bandwidth should be cleared first as it may require more LSPs to be rerouted and if other links are cleared first, it may be difficult to reroute these LSPs. Failure to clear a single link means that the route cannot be used for rerouting.

(3b) LinkWithFattestLSPFirst: This heuristic assumes that it is better to reroute the fattest LSP first as it is more difficult to reroute a fat LSP that requires more resources, than a thin LSP. Therefore the link with the LSP with maximum bandwidth should be cleared first. Note that if the required decrease in load of the link is much smaller than the LSP bandwidth, this LSP should not be considered for rerouting.

(3c) LinkWithLongestLSPFirst: This heuristic is similar to the previous one, the difference being that this assumes that it is more difficult to reroute a long LSP than a short one. Therefore the long LSP should be rerouted as early as possible and hence the link containing this LSP should be preferred for HZC. A single heuristic or a combination of the above is used by the disclosed algorithm to achieve the results presented below.

Since the disclosed algorithm uses a search tree, it is advantageous to limit the tree size to make the run-time overhead tolerable. The running time is important since the disclosed algorithm preferably operates as an online process. Following are three techniques used to improve run-time complexity:

(1) Bound Tree Depth: The algorithm reduces the search space by limiting the depth of the recursion (parameter D). Note that for D=1, LSPs outside the hot zone are never rerouted whereas D>1 implies that LSPs not in the hot zone may have to be rerouted to free enough resources for rerouting the LSPs passing through the hot zone.

(2) Bound Fan-out: The tree fan-out is controlled by limiting the number of alternate candidate routes explored for each LSP. To further lower run-time overhead, the algorithm precomputes a fixed set of k candidate routes for all source-destination pairs in the network.

(3) Route Caching: Since the exploration of the tree for each LSP is based on the candidate routes, the common links prefix property of the candidate routes can be used to improve the run time of the algorithm. Consider an LSP request from routers C to F in the example network. Assume the first candidate route explored is C-A-B-F and that HZC failed along this route (e.g., if the tree depth limit is reached). If the next candidate route chosen is C-A-E-F, the exploration of link C-A in the context of the first candidate route is equally valid now. Thus, caching the result of prior exploration reduces the total work needed whenever candidate routes share prefixes of size more than one. The savings from caching improve as greater number of candidate routes have to explored. Fast lookups of the cached data are done using a trie-based index.

The performance of the disclosed algorithm based on the heuristics mentioned above will now be described and compared with other global flow-design based, less practical approaches.

The performance of the disclosed algorithm will now be explored. The goal is to investigate the impact of the heuristics used in the algorithm on its performance and scalability, particularly from an implementation viewpoint. Since an optimal solution is not known, it will be compared against a benchmark that uses a multicommodity flow (MCF) formulation to solve the flow design problem. In other words, given the end-to-end demands from the hot zone, the MCF formulation determines new flow paths for them if available and will be referred to hereinafter as "the ideal solution."

Note that the ideal solution is impractical for various reasons. Firstly, it provides new routes without a path migration sequence (and, which may not exist at all). Secondly, a MCF formulation allows a demand to be split across multiple flows, and therefore mapping them to specific flows is a "hard" problem by itself. Thus, the ideal solution is used merely to provide a loose theoretical bound for the reroutable flow from the hot zone by which to compare the ability of the disclosed algorithm to reroute traffic from the hot zone.

The MCF formulation of the flow design problem can be solved approximately using linear programming (LP). An LP formulation from Ramamurthy, et al., supra, may be adapted as follows:

$$\text{Maximize:} \quad \sum_{\sigma} \sum_{r \in R_\sigma} X_r \quad (1)$$

$$\text{Constraints:} \quad C1: \sum_{r \in R_\sigma} X_r \le \lambda_\sigma, \forall \sigma \quad (2)$$

$$C2: \sum_{\sigma} \sum_{r \in R_\sigma, \exists l \in r} X_r \le \beta * B_l - C_l, \forall \, l \notin HZ \quad (3)$$

-continued $$C3: \sum_{\sigma} \sum_{r \in R_\sigma, \exists l \in r} X_r \leq \alpha * B_l, \forall l \in HZ \quad (4)$$

where, σ is a source-destination pair, $R_\sigma$ is a candidate route set for a specific pair σ, r is a candidate route belonging to $R_\sigma$, $X_r$ is the total flow volume belonging to r, $\lambda_\sigma$ the total flow volume from the hot zone for source-destination pair σ, $B_1$ is the total bandwidth of link 1 and HZ is the set of links inside the hot zone. $C_1$ is the bandwidth being used by flows outside the hot zone on link 1 and α and β are as defined below.

Figure 5:
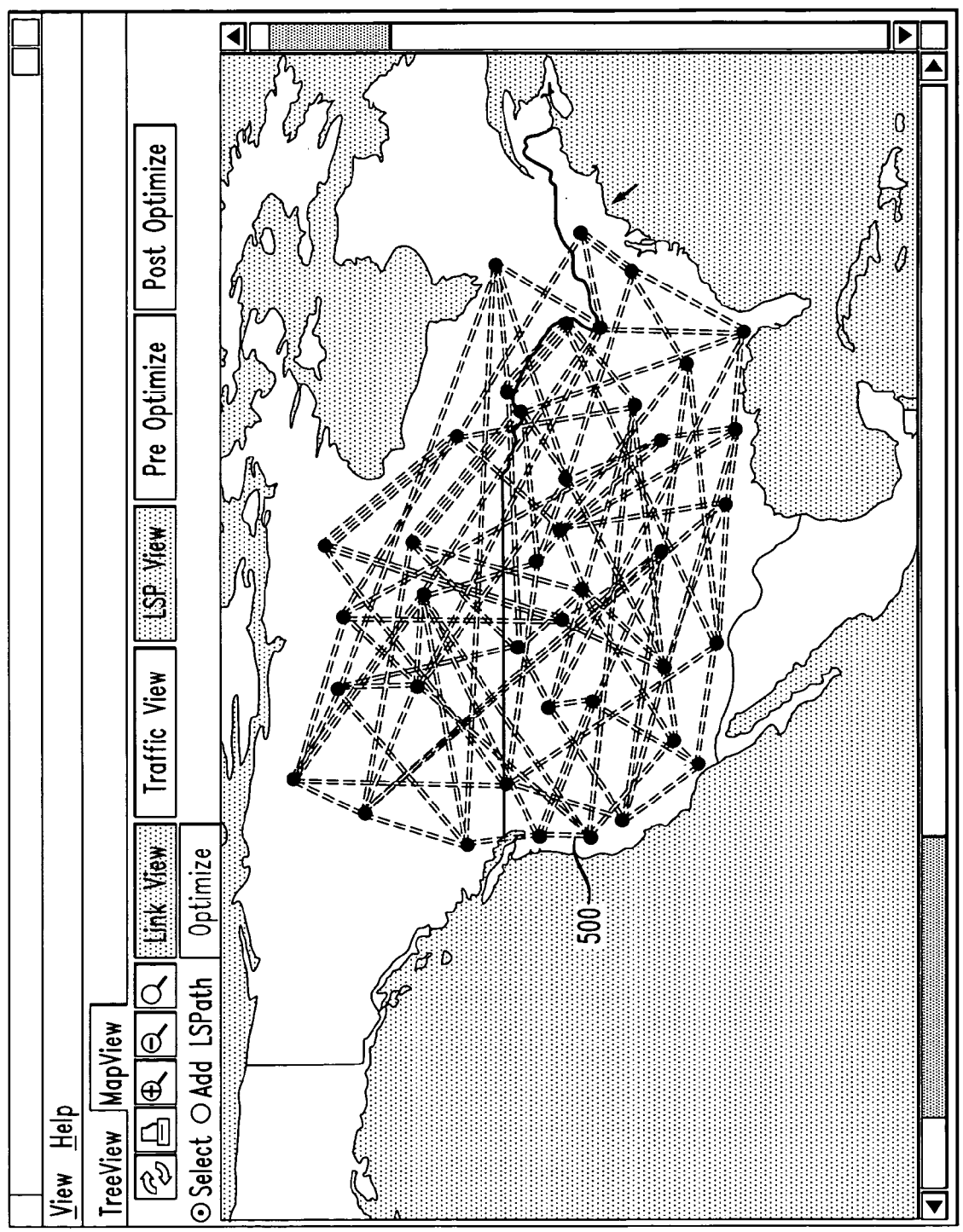
FIG. 5 illustrates a map of a simulation network employed in testing the performance of the disclosed algorithm.

FIG. 5 illustrates a map of a simulation network 500 employed in testing the performance of the disclosed algorithm. The simulation network 500 has 40 nodes and 100 bi-directional links. Each link has a bandwidth of 10,000 MB. The LSP sizes will be assumed to vary between 100 MB to 1000 MB. The goal of the experiments is to completely clear the hot zone (α=0%) while allowing the rest of the network to be loaded to its full capacity if necessary (β=100%). The primary performance metric is the total bandwidth actually routed (TBR) out of the hot zone, as a percentage of the bandwidth to be rerouted. This metric only captures a portion of the utility of the disclosed algorithm since, unlike the ideal solution, the disclosed algorithm also ensures a hitless transition. In the following graphs, NetLoad refers to the average load on the simulation network 500, the HZSize refers to the size of the hot zone, specified as a percentage of total links.

To control the running time of the disclosed algorithm the tree depth D is limited to 3 and the number of candidate route per source-destination pair k is limited to 10 (same for the ideal solution). Given the formulation of the ideal solution above, it works on the residual network without disturbing the LSPs outside the hot zone and hence it attempts the equivalent of the disclosed algorithm at D=1.

EXPERIMENT 1

Total Flow Routed

Figure 6A:
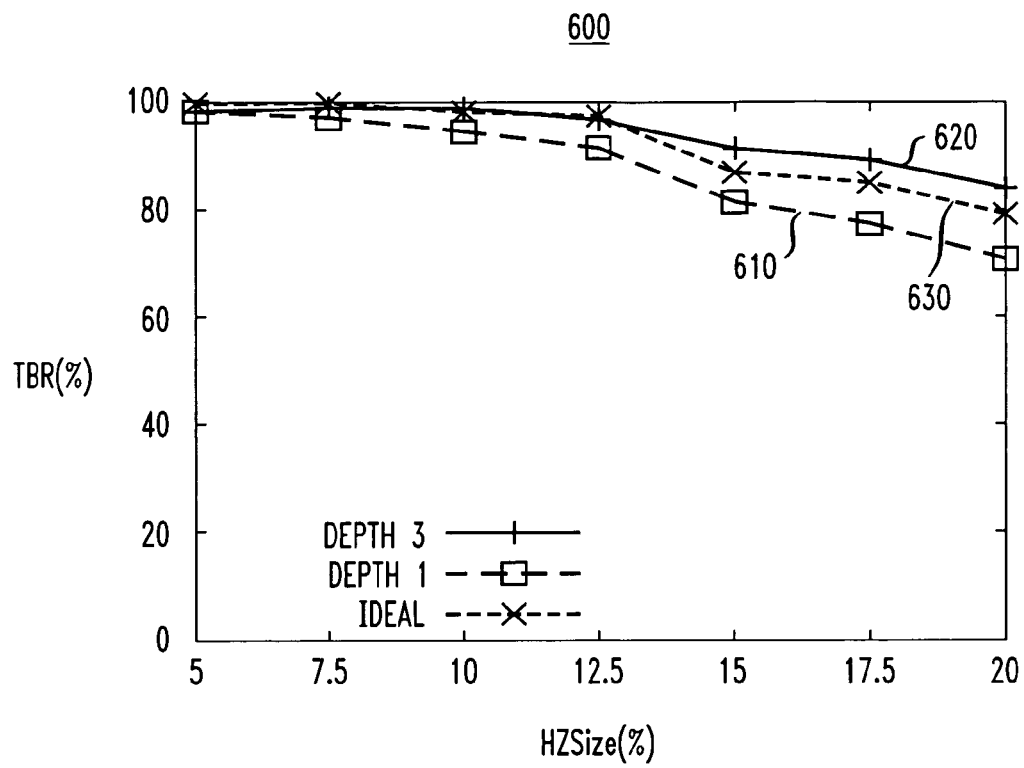
FIG. 6A is a graph comparing the disclosed algorithm and an ideal solution in terms of total bandwidth actually routed (TBR)

Turning now to FIG. 6A, illustrated is a graph 600 comparing the disclosed algorithm and an ideal solution in terms of TBR for NetLoad=60%. Two lines 610, 620 for the disclosed algorithm are for depths three (D=3) (the line 620) and one (D=1) (the line 610).

As expected, increasing the hot zone size lowers the ability to reroute traffic. The performance of the ideal solution, (line 630) falls substantially below that of the disclosed algorithm as the hot zone size increases. This shows that the disclosed algorithm is able to reroute more requests in addition to achieving a hitless migration. This impressive performance of the disclosed algorithm is due to its ability to reroute LSPs that are not in the hot zone to free enough resources for rerouting LSPs from the hot zone. Therefore, at depth one where no LSPs outside the hot zone are rerouted, the ideal solution outperforms the disclosed algorithm. This is not surprising as the ideal solution has many advantages (such as allowing demands to be split). As the next few experiments demonstrate, the extra clearing provided by exploring deeper in the tree is achieved with minimal increase in run-time overhead. Thus, in spite of using a greedy strategy to combine the flow design and migration steps, the disclosed algorithm is able to outperform the ideal solution. Going forward, the performance of the disclosed algorithm will be explored on other metrics.

EXPERIMENT 2

Sensitivity of the Algorithm to D

Figure 6B:
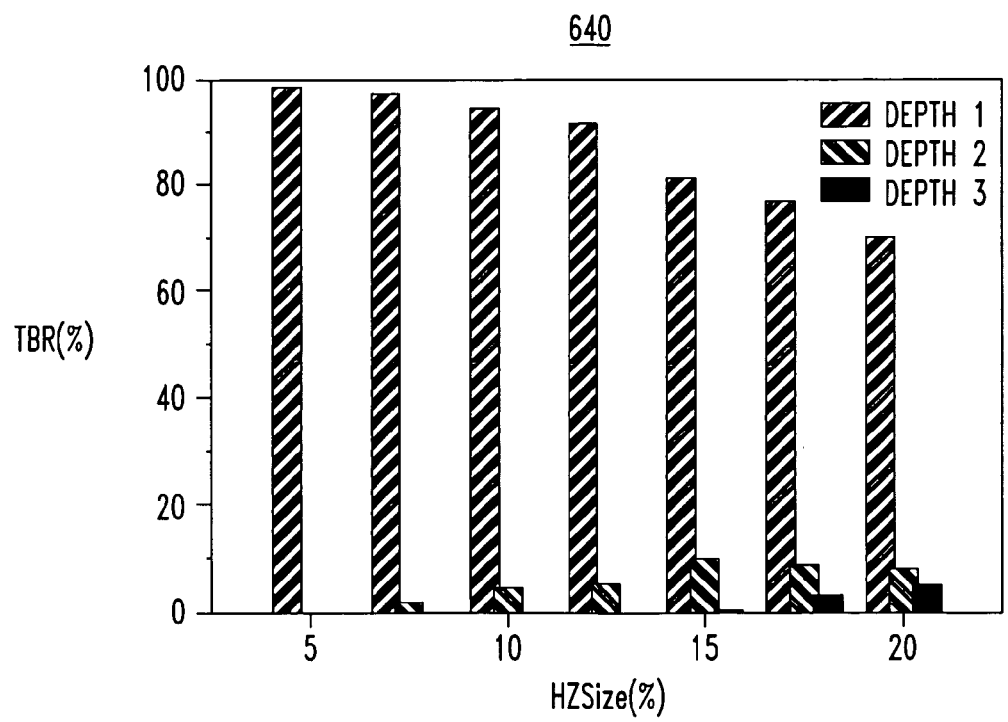
FIG. 6B is a histogram illustrating the sensitivity of the algorithm to depth (D)

Turning now to FIG. 6B, illustrated is a histogram 640 illustrating the sensitivity of the algorithm to depth (D). As can be seen, most of the bandwidth gets cleared at depth one since the simulation network 500 of FIG. 5 is 60% loaded. However, as the hot zone size increases, the combined contribution of D=2, 3 starts to increase going from 0% at HZSize=5% to almost 15% at HZSize=20%. This implies that as the hot zone grows, rerouting a single LSP requires other LSPs to be first rerouted to free sufficient bandwidth. Note that while the contributions of depths two and three are low quantitatively, these gains are however the hardest to achieve (Experiment 5). Thus, a depth of one often suffices for most cases and going beyond that is necessary for cases where the hot zone bandwidth is a critical resource.

EXPERIMENT 3

Sensitivity to NetLoad

Figure 7A:
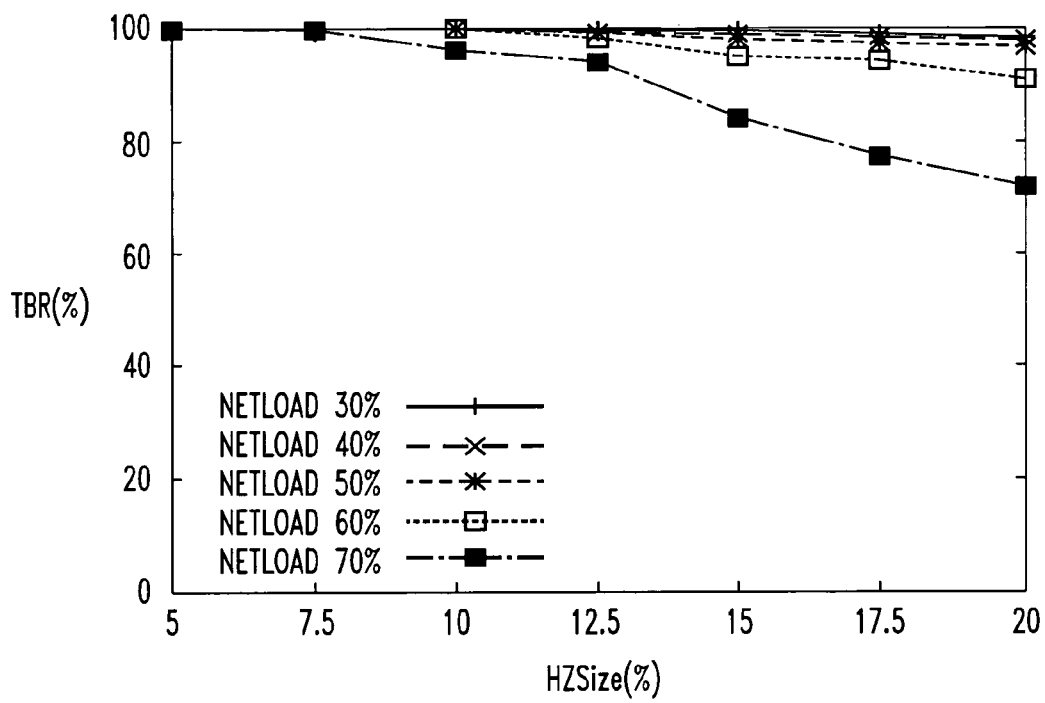
FIGS. 7A and 7B are graphs depicting sensitivity of the network to NetLoad and hot zone sizes (FIG. 7A) and runtime cost (FIG. 7B)

Turning now to FIG. 7A, illustrated is a graph 700 depicting sensitivity of the network to NetLoad and hot zone sizes. FIG. 7A shows that the TBR decreases both as a function of increasing HZSize and increasing NetLoad. This is expected since both factors limit the available bandwidth in the simulation network 500 of FIG. 5 for reconfiguring the traffic. However, it is important to note that service provider network loads are typically limited to 50-60% in order to ensure sufficient spare capacity for unanticipated failures. As can be seen from FIG. 7A, for loads of up to 60%, the disclosed algorithm is able to clear more than 80% of the hot zone even when its size is 20% of the simulation network 500 of FIG. 5. In practice, on a large provider network, hot zone sizes would typically be much smaller, wherein the performance is even more attractive.

EXPERIMENT 4

Saving from Route Caching

As highlighted above, caching portions of the subtree from prior explorations can save run-time cost. Turning now to FIG. 8B, illustrated is a graph 830 illustrating the effect of the disclosed algorithm savings due to caching. FIG. 8B shows the savings from caching in terms of the percentage reduction in the number of LSPs explored by the algorithm, which directly translates into savings in run-time of the algorithm. FIG. 8B shows that when the hot zone size is small, the savings are less stable as fewer LSPs are explored. A difference of even a single LSP could contribute significantly to the savings.

As the hot zone size increases, the average savings from caching also increase from around 5% to a significant 20%. This is due to the fact that, with the increase in hot zone size, more searches have to be performed to find a valid solution. Therefore, run-time savings from caching increase when it matters most, that is when the run-time of the algorithm itself increases.

In the last two experiments, the tangible factors that directly impact the operator will be considered, namely, the run-time tuning costs and the network efficiency improvements achieved.

EXPERIMENT 5

Run-time Overhead

Figure 7B:
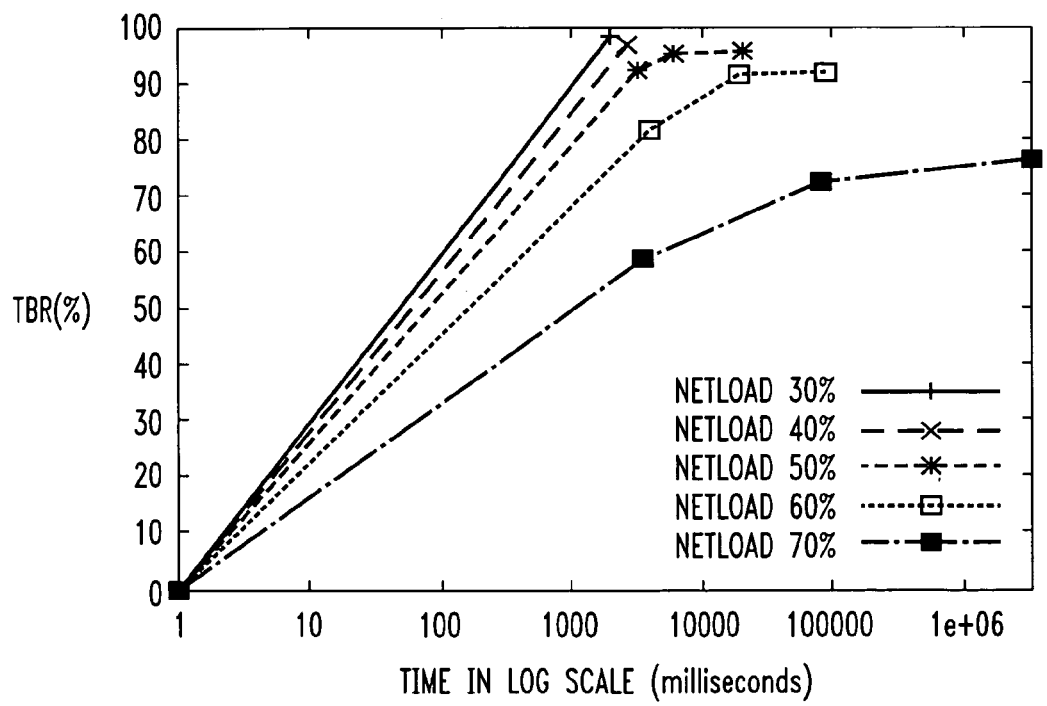

Turning now to FIG. 7B, illustrated is a graph 710 depicting sensitivity of the network to run-time cost. FIG. 7B depicts the time taken by the disclosed algorithm to complete the run for a hot zone size of 15%. The graph shows that the disclosed algorithm indeed runs quickly, delivering output for depth one in a few seconds or less (note the x-axis is in logarithmic scale and the points on the curves refer to depth level). As expected, the time taken to explore depths two and three is longer but also delivers the more complex migration sequences as the load increases. This graph shows that, while depth one rapidly achieves most of transitions, exploring further is also practically feasible, rarely requiring more than ten seconds to complete. (These experiments were performed on a Sun Ultra-4 Sparc with 4096 MB memory running SunOS 5.7.) This demonstrates that the disclosed algorithm is an effective online algorithm.

EXPERIMENT 6

Capital Expenditure Savings:

The primary goal for the service provider is the increased efficiency one might expect from tuning. This will be studied by investigating how rapidly the simulation network 500 of FIG. 5 grows with and without network tuning. The link load threshold will be assumed to be 60%. Simulating a real provider network, it will be assumed that if a demand drives a link usage above this load threshold, a new parallel link will be provisioned.

To illustrate the improvement achieved by tuning, the same experiment will be run with HZC triggered periodically. For this case, each link will be allowed to be loaded up to 80% of its capacity. When a link exceeds the 80% load threshold, all links that are loaded beyond 60% will be considered to be the hot zone, and the HZC will be triggered on these heavily loaded links. If the HZC tuning fails to bring the utilization of any link below 60%, a parallel link will be provisioned as before.

Figure 8A:
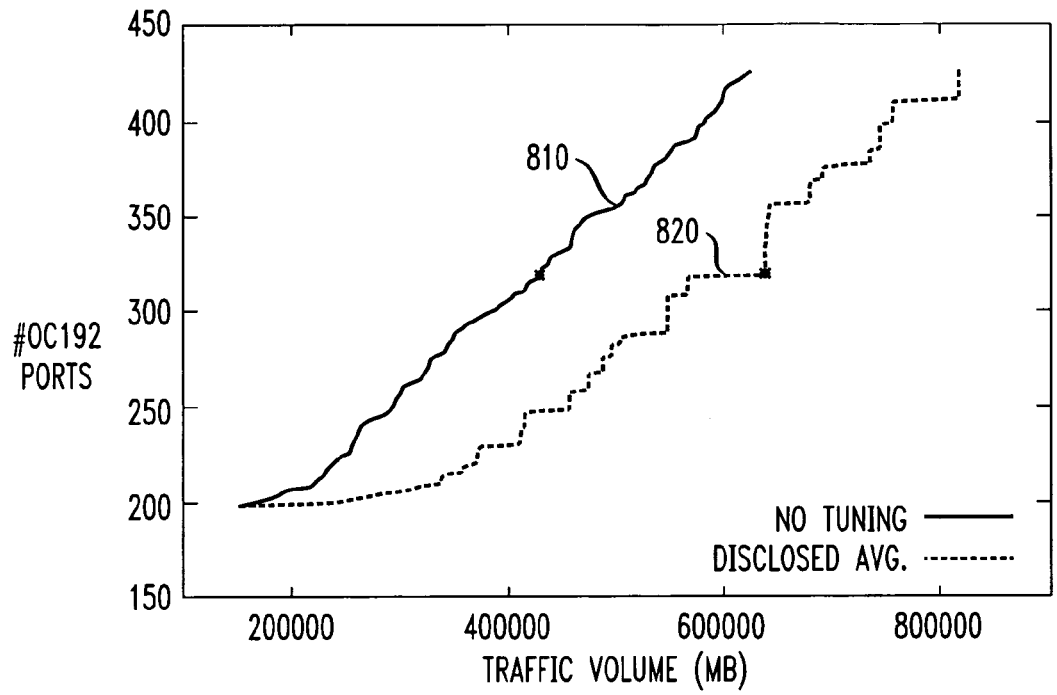
FIGS. 8A and 8B are graphs illustrating the effect of the disclosed algorithm on network growth (FIG. 8A) and savings due to caching (FIG. 8B).
Figure 8B:
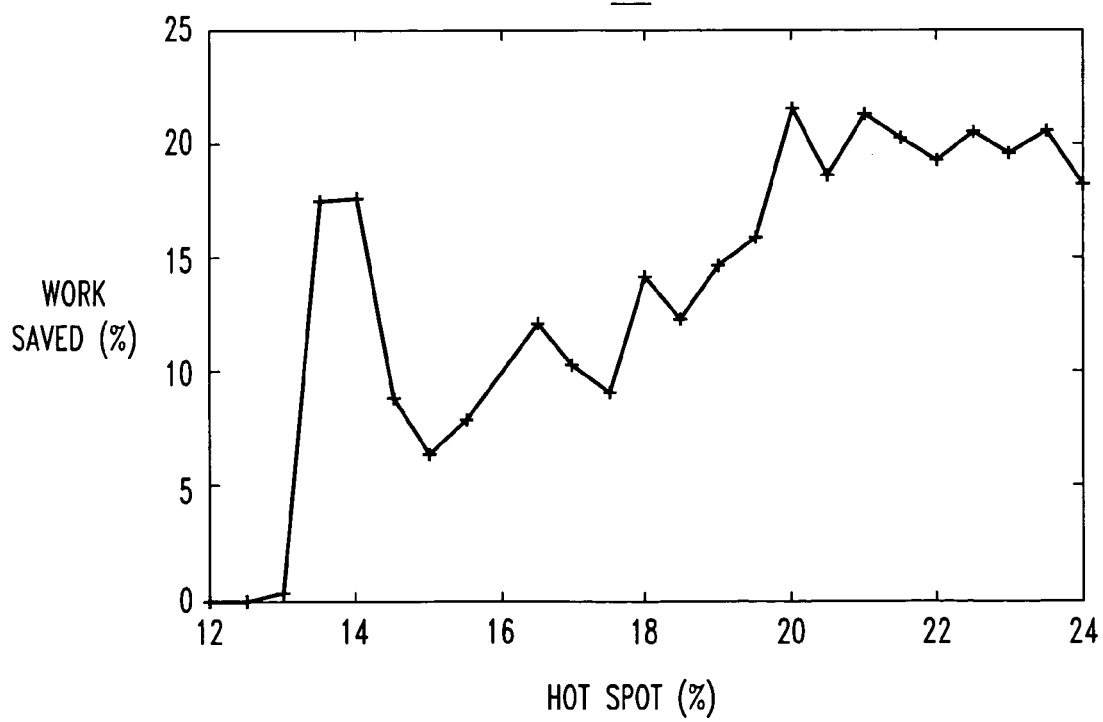

Turning now to FIG. 8A, illustrated is a graph 800 illustrating the effect of the disclosed algorithm on network growth. FIG. 8A shows the traffic volume on the x-axis and the size of the simulation network 500 of FIG. 5 as represented by the number of OC-192 interface cards required to support the traffic in the y-axis. As can be seen, the network growth without any tuning (line 810) is much more rapid, growing roughly linearly with the traffic growth. On the other hand, HZC tuning has a significantly lower slope of growth (line 820).

Moreover, the disclosed algorithm can save capital expenses by delaying the provisioning of hardware, to the extent possible, as seen from the step-like growth curve (the line 820). Viewing the data differently, compare the network capacity supported for the same network hardware. The results show that, in some cases, tuning allows the simulation network 500 of FIG. 5 to carry 50% more traffic (e.g., for 318 ports) for the same network infrastructure. Translating this into monetary cost of networking hardware saved, this is significant capital expenditure savings for a service provider.

Although the present invention has been described in detail, those skilled in the art should understand that they can make various changes, substitutions and alterations herein without departing from the spirit and scope of the invention in its broadest form.

What is claimed is:

1. A system for multi-protocol label switching network tuning, comprising:
   network elements;
   links connecting said network elements;
   a hot zone clearing subsystem that recursively identifies label switched paths (LSPs) to be rerouted from a defined hot zone, each LSP of said identified LSPs including multiple of said links, said hot zone including network elements to be avoided; and
   an LSP ordering subsystem, coupled to said hot zone clearing subsystem, that orders said identified label switched paths (LSPs), wherein said each of said identified LSPs are to be rerouted to a single corresponding alternative route to yield a migration sequence, said migration sequence employable to reduce a load of said defined hot zone.

2. The system as recited in claim 1 wherein said hot zone clearing subsystem recursively identifies said label switched paths (LSPs) subject to a defined recursion depth.

3. The system as recited in claim 1 wherein said hot zone clearing subsystem recursively identifies said label switched paths (LSPs) until said load is decreased to a defined level.

4. The system as recited in claim 1 wherein said LSP ordering subsystem orders said label switched paths (LSPs) according to a selected one of:
   a number of links of said label switched paths (LSPs) in said defined hot zone, and
   a bandwidth of said label switched paths (LSPs).

5. The system as recited in claim 1 wherein said label switched paths (LSPs) are rerouted to candidate routes selected according to a selected one of:
   a load on maximally utilized links in said candidate routes,
   a length of said candidate routes, and
   a sharing of said maximally utilized links with said label switched paths (LSPs).

6. The system as recited in claim 5 wherein, when one of said candidate routes lacks sufficient free bandwidth on any link thereof, said hot zone clearing subsystem recursively identifies said label switched paths (LSPs) to be rerouted from a second defined hot zone containing said selected one of said candidate routes.

7. The system as recited in claim 1 wherein said LSP ordering subsystem orders said label switched paths (LSPs) based on a selected one of:
   a least available bandwidth,
   a greatest bandwidth, and
   a number of links.

8. A method of multi-protocol label switching network tuning, comprising:
   recursively identifying label switched paths (LSPs) to be rerouted from a defined hot zone, said hot zone includes network elements to be avoided, each LSP of said identified LSPs includes multiple links, and each of said links connecting said network elements; and
   ordering said identified label switched paths (LSPs), wherein said each of said identified LSPs are to be rerouted to a single corresponding alternative route to yield a migration sequence, said migration sequence employable to reduce a load of said defined hot zone.

9. The method as recited in claim 8 wherein said recursively identifying is carried out subject to a defined recursion depth.

10. The method as recited in claim 8 wherein said recursively identifying is carried out until said load is decreased to a defined level.

11. The method as recited in claim 8 wherein said ordering is carried out according to a selected one of:
   a number of links of said label switched paths (LSPs) in said defined hot zone, and
   a bandwidth of said label switched paths (LSPs).

12. The method as recited in claim 8 wherein said label switched paths (LSPs) are rerouted to candidate routes selected according to a selected one of:
   a load on maximally utilized links in said candidate routes,
   a length of said candidate routes, and
   a sharing of said maximally utilized links with said label switched paths (LSPs).

13. The method as recited in claim 12 wherein, when selected one of said candidate routes lacks sufficient free bandwidth on any link thereof, said recursively identifying is carried out with respect to a second defined hot zone containing said one of said candidate routes.

14. The method as recited in claim 8 wherein said ordering is based on a selected one of:
   a least available bandwidth,
   a greatest bandwidth, and
   a number of links.

15. A system for multi-protocol label switching network tuning, comprising:
   network elements;
   links connecting said network elements;
   a hot zone clearing subsystem that recursively identifies label switched paths (LSPs) to be rerouted from a defined hot zone, each LSP of said identified LSPs including multiple of said links, said hot zone including network elements to be avoided and a defined recursion depth; and
   an LSP ordering subsystem, coupled to said hot zone clearing subsystem, that orders said identified label switched paths (LSPs), wherein said each of said identified LSPs are to be rerouted to a single corresponding alternative route to yield a migration sequence, said LSP ordering subsystem ordering said label switched paths (LSPs) based on a selected one of:
   a least available bandwidth,
   a greatest bandwidth, and
   a number of links.

16. The system as recited in claim 15 wherein said hot zone clearing subsystem recursively identifies said label switched paths (LSPs) until said load is decreased to a defined level.

17. The system as recited in claim 15 wherein said LSP ordering subsystem orders said label switched paths (LSPs) according to a selected one of:
   a number of links of said label switched paths (LSPs) in said defined hot zone, and
   a bandwidth of said label switched paths (LSPs).

18. The system as recited in claim 15 wherein said label switched paths (LSPs) are rerouted to candidate routes selected according to a selected one of:
   a load on maximally utilized links in said candidate routes,
   a length of said candidate routes, and
   a sharing of said maximally utilized links with said label switched paths (LSPs).

19. The system as recited in claim 18 wherein, when one of said candidate routes lacks sufficient free bandwidth on any link thereof, said hot zone clearing subsystem recursively identifies said label switched paths (LSPs) to be rerouted from a second defined hot zone containing said one of said candidate routes.

* * * * *